United States Patent
Gilman et al.

(10) Patent No.: US 9,267,232 B2
(45) Date of Patent: Feb. 23, 2016

(54) SYNTHETIC TURF SYSTEM HAVING AN INFILL TRAPPING STRUCTURE

(75) Inventors: John Gilman, Hampstead (CA); Derek Bearden, Dalton, GA (US)

(73) Assignee: TARKETT INC., Farnham (CA)

( * ) Notice: Subject to any disclaimer, the term of this patent is extended or adjusted under 35 U.S.C. 154(b) by 100 days.

(21) Appl. No.: 11/273,584

(22) Filed: Nov. 12, 2005

(65) Prior Publication Data

US 2006/0216458 A1    Sep. 28, 2006

Related U.S. Application Data

(60) Provisional application No. 60/594,267, filed on Mar. 24, 2005.

(51) Int. Cl.
| | | |
|---|---|---|
| *E01C 13/08* | (2006.01) | |
| *B32B 5/30* | (2006.01) | |
| *D06N 7/00* | (2006.01) | |
| *B32B 3/08* | (2006.01) | |
| *B32B 27/14* | (2006.01) | |
| *D02G 3/44* | (2006.01) | |

(52) U.S. Cl.
CPC ............. *D06N 7/0065* (2013.01); *B32B 3/085* (2013.01); *B32B 5/30* (2013.01); *B32B 27/14* (2013.01); *D02G 3/445* (2013.01); *E01C 13/08* (2013.01); *B32B 2250/02* (2013.01); *B32B 2471/00* (2013.01); *D06N 2205/10* (2013.01); *D06N 2205/14* (2013.01); *D10B 2505/202* (2013.01); *Y10T 428/23921* (2015.04); *Y10T 428/23929* (2015.04); *Y10T 428/23936* (2015.04); *Y10T 428/23957* (2015.04); *Y10T 428/23993* (2015.04)

(58) Field of Classification Search
CPC . E01C 13/08; Y10S 273/13; D10B 2505/202; D06N 7/0065; D06N 2205/10; D06N 2205/14; B32B 5/30; Y10T 428/23921; Y10T 428/23936; Y10T 428/23957; Y10T 428/23993
USPC ......................................... 428/87, 89, 92, 17
See application file for complete search history.

(56) References Cited

U.S. PATENT DOCUMENTS

| | | | |
|---|---|---|---|
| 3,940,522 A | | 2/1976 | Wessells |
| 3,974,312 A | * | 8/1976 | Stevens et al. ................... 428/91 |
| 4,340,631 A | | 7/1982 | Endo et al. |
| 5,601,886 A | | 2/1997 | Ishikawa et al. |

(Continued)

FOREIGN PATENT DOCUMENTS

| | | |
|---|---|---|
| CA | 1246109 | 12/1988 |
| CA | 2 441 993 A1 | 9/2002 |

(Continued)

OTHER PUBLICATIONS

International Search Report of PCT/IB2005/004135.

(Continued)

*Primary Examiner* — Cheryl Juska
(74) *Attorney, Agent, or Firm* — Winston & Strawn LLP

(57) ABSTRACT

The present invention is directed to a synthetic turf system including a backing member having a plurality of monofilament ribbons—soft and stiff—projecting there from. A layer of particulate material lies above the backing member and among the monofilament ribbons wherein the soft monofilament ribbons facilitates the stabilization or trapping of the particulate material.

23 Claims, 4 Drawing Sheets

(56) References Cited

U.S. PATENT DOCUMENTS

| | | | |
|---|---|---|---|
| 5,887,416 A | 3/1999 | Shimono et al. | |
| 5,958,527 A | 9/1999 | Prevost | |
| 6,242,062 B1 | 6/2001 | De Vries | |
| 6,299,959 B1 | 10/2001 | Squires et al. | |
| 6,338,885 B1 | 1/2002 | Prevost | |
| 6,372,310 B2 | 4/2002 | de Vries | |
| 6,468,622 B1 | 10/2002 | Combs et al. | |
| 6,491,991 B2 | 12/2002 | Seaton | |
| 6,551,689 B1 | 4/2003 | Prevost | |
| 6,620,482 B2 | 9/2003 | Carr et al. | |
| 6,673,444 B2 | 1/2004 | Yuuki et al. | |
| 6,723,412 B2 | 4/2004 | Prevost | |
| 6,746,752 B2 | 6/2004 | Prevost | |
| 6,753,049 B2 | 6/2004 | De Vries | |
| 6,767,595 B2 | 7/2004 | Prevost et al. | |
| 6,858,272 B2 | 2/2005 | Squires | |
| 6,946,181 B2 | 9/2005 | Prevost | |
| 7,153,553 B2* | 12/2006 | Tetrault | 428/17 |
| 7,249,913 B2* | 7/2007 | Linville | 404/73 |
| 7,357,966 B2* | 4/2008 | Dipple et al. | 428/17 |
| 2001/0033902 A1* | 10/2001 | Seaton | 428/15 |
| 2003/0099787 A1 | 5/2003 | Fink | |
| 2003/0108688 A1 | 6/2003 | De Vries | |
| 2003/0157275 A1 | 8/2003 | Weghuis et al. | |
| 2004/0229007 A1 | 11/2004 | Motz et al. | |
| 2006/0107880 A1* | 5/2006 | Peeples | 112/80.41 |
| 2008/0124496 A1* | 5/2008 | Avery | 428/17 |
| 2008/0125237 A1* | 5/2008 | Avery | 473/278 |

FOREIGN PATENT DOCUMENTS

| | | |
|---|---|---|
| CA | 2436914 | 12/2002 |
| DE | 3525441 A1 | 1/1987 |
| EP | 0301843 | 2/1989 |
| EP | 0301843 A1 | 2/1989 |
| EP | 0381292 | 8/1990 |
| EP | 0678622 A1 | 4/1995 |
| EP | 0776762 A1 | 6/1997 |
| EP | 1564279 A1 * | 8/2005 |
| FR | 2719619 A1 | 11/1995 |
| GB | 2 231 276 | 11/1990 |
| JP | 49103722 | 12/1947 |
| JP | 44009754 | 4/1969 |
| JP | 51-57934 A | 5/1976 |
| JP | 55012811 | 1/1980 |
| JP | 63223204 | 9/1988 |
| JP | 3247804 | 11/1991 |
| JP | 5171613 | 7/1993 |
| JP | 4011869 | 10/1993 |
| JP | 5272110 | 10/1993 |
| JP | 4054673 | 1/1994 |
| JP | 6-158609 A | 6/1994 |
| JP | 0-100509 A | 4/1997 |
| JP | H11-93111 A | 4/1997 |
| JP | 9-217311 A | 8/1997 |
| JP | 9217311 | 8/1997 |
| JP | 9-273107 A | 10/1997 |
| JP | 9273108 | 10/1997 |
| JP | 9273109 | 10/1997 |
| JP | 10-204815 A | 8/1998 |
| JP | H11-93112 A | 4/1999 |
| JP | 2000-328510 | 11/2000 |
| JP | 2001-098508 | 4/2001 |
| JP | 2002-227122 | 8/2002 |
| JP | 2003-342848 | 12/2003 |
| JP | 2005-60973 A | 3/2005 |
| WO | WO 95/09949 A1 | 4/1995 |
| WO | WO 98/40559 | 9/1998 |
| WO | WO 98/55697 | 12/1998 |
| WO | WO 01/48322 A1 | 7/2001 |
| WO | WO 01/61110 A1 | 8/2001 |
| WO | WO 2004/077914 A2 | 9/2004 |
| WO | WO 2005/005731 A2 | 1/2005 |
| WO | WO 2004/106601 A1 | 12/2005 |
| WO | WO 2006/085751 | 8/2006 |

OTHER PUBLICATIONS

European Search Report of EP 05 02 5310.

Installation Specification by Greenfields B.V. in The Netherlands, dated Jun. 16, 2003.

Installation Specification by Greenfields B.V. in The Netherlands, dated Sep. 30, 2005.

Opposition Against European Patent No. 1707291 filed Dec. 24, 2008.

Opposition Against European Patent No. 1707291 filed Dec. 29, 2008.

* cited by examiner

SYNTHETIC TURF SYSTEM HAVING AN INFILL TRAPPING STRUCTURE

RELATED APPLICATIONS

The present invention claims the benefit of the priority date of U.S. Provisional Patent Application Ser. No. 60/594,267, filed Mar. 24, 2005, and is incorporated by reference herein.

BACKGROUND OF THE INVENTION

1. Field of the Invention

The present invention is directed toward synthetic turf systems, and more particularly toward synthetic turf sports surfaces. The present invention utilizes a synthetic turf system having an infill material atop a backing and interspersed between upwardly projecting monofilament ribbons simulating blades of grass, wherein the blades of grass have an improved appearance and performance.

2. Description of Related Art

Synthetic turf systems have been utilized for over forty years to provide a surfacing alternative where it is impossible, impractical, or simply undesirable to have a real grass surface. The more desirable synthetic turf systems on the market incorporate an infill material between upstanding blades of synthetic fibers that resemble blades of grass. The infill material enables a variety of features and characteristics to be imparted to the actual playing surface, while simultaneously enabling the synthetic fibers to retain a grass-like appearance. Thus, improved drainage, resiliency, predictability of sports play, reduction of injuries, and other advantages can be imparted to the synthetic turf surface, while maintaining an appealing appearance.

One particular function of the infill in a synthetic turf system is as a stabilizing force for the synthetic fiber blades. The synthetic blades in infill-type synthetic turf systems are relatively long (as compared to non-infilled systems); for example, between 1½-2½ inches long—so as to provide optimum surface "feel" and appearance. Therefore, to maintain these types of fibers in a substantially upright orientation, the infill material has been applied up to a pre-determined depth (or thickness), relative to the height of the fibers. In turn, the infill provides, amongst other things, a supportive base for the synthetic fibers.

The existence of a thickness of infill material incorporates its own problems, however. Infill materials preferably include a combination of particulate material, such as hard particles, a mixture of resilient and hard particles, or resilient particles alone. In turn, the particulate material can interfere with enjoyment of the synthetic surface by dislodging when struck by feet, played balls, or by direct contact with athletes. The dislodging of the infill is known generally as "infill splash." The synthetic fiber blades help to diffuse and/or eliminate infill splash by, amongst other things, acting as a barrier for dislodging the infill materials, and by stabilizing the infill between the blades.

Conventionally, the combination of fiber-positioning and infill retention was accomplished, in part, through the use of relatively flexible slit-film-type polymeric blades. Such blades were typically woven or tufted into the backing layers of the synthetic grass surface, and then fibrillated into a web-like structure to maximize infill support and retention of the infill by the blades. Additionally, the free ends of these fibers would bend over the top of the infill to create an infill trapping effect. Unfortunately, such has resulted in problems in certain synthetic turf fields, including the tendency of these fibers to flatten out into a smooth surface without adequate grooming.

As an alternative to the slit-film type blade, monofilament blades can be utilized. Monofilament blades for synthetic grass are manufactured by extruding a resultant single polymer (or similar) blade from a device, such as a spinneret, into a long polymer strand, finishing that strand and then cutting single monofilament pieces from the strand. Typically, multiple monofilament elements are bound together at their base to create a single bundle of blades, which are then tufted into the backing layer of the synthetic grass surface, and fibrillated outwards.

One significant problem with the use of monofilament fibers in this manner, however, is the balance between the fiber characteristics needed for proper installation of the surface, and fiber characteristics that ensure the best surface conditions for game play and/or surface use. Typically, in order to properly install the infill on the synthetic grass surface, it has been necessary to utilize a relatively rigid/stiff monofilament fiber, so that the monofilament bundles are not buried under the infill as the infill is being applied.

After the infill has been applied to a desirable depth, the free ends of the monofilament fibers (those ends extending above the top of the infill) stand substantially upright. While this type of fiber positioning does offer some benefits—such as balls rolling closer to the way they would roll or bounce on a natural turf surface—it unfortunately also results in some undesired side effects. Specifically, unlike the free ends of softer fiber, which fold or bend over as a ball rolls over them, such an effect is not as prevalent when the stiffer fibers are used. Accordingly, as a ball rolls over the top surface of a synthetic playing surface using such relatively stiff fibers, the infill material becomes more easily displaced resulting in a significant amount of infill splash during game play.

On the other hand, the use of flexible fibers creates problems as well. While the fibers can help reduce infill splash during game play, they can make infill application more difficult during installation, and, can result in less than desirable resistance for ball roll and ball bounce during use. Similar to conventional carpet-type surfaces, rolling or bouncing balls are subjected to "sliding" issues on soft fibers surfaces. Sliding issues include unexpectedly proficient hops, a lack of grass-like roll response, and slippage on spinning balls when they contact the synthetic grass surface.

It is therefore an object of the present invention to overcome these and other issues associated with conventional synthetic turf systems. These and other objects will become apparent to one of ordinary skill in the art in light of the specification, claims, and drawings appended hereto.

SUMMARY OF THE INVENTION

The present invention is directed to a synthetic turf system comprising a backing member and a layer of particulate material dispersed above the backing member. A plurality of monofilament ribbons, preferably bundled, are operatively attached to the backing member. Each bundle may exclusively include a plurality of soft or stiff ribbons, or may include a combination of soft and stiff ribbons. The bundles of monofilament ribbon may be configured within the synthetic turf system in various geometric patterns; including, but not limited to, parallel and/or intersecting straight or curved rows, circles, rectangles, etc. The soft ribbon and the stiff ribbon each include a free end extending out of and above the layer of particulate material wherein the stiff ribbon stands substantially more erect above the layer of particulate material than the soft ribbon.

Another aspect of the present invention is directed to a synthetic turf system comprising a backing member and a layer of particulate material dispersed above the backing member. A relatively stiff monofilament ribbon having a free end is operatively attached to the backing member wherein the free end of the stiff monofilament ribbon extends through and above the layer of particulate material. A relatively soft monofilament ribbon—as compared to the stiffer monofilament ribbon—includes a free end and is operatively attached to the backing member wherein the free end of the soft monofilament ribbon extends through and above the layer of particulate material. The soft monofilament ribbon further includes a means for trapping particulate material such that the soft monofilament ribbon stands substantially less erect above the layer of particulate material than the stiff monofilament ribbon.

Yet a further aspect of the present invention is directed to a method of installing a synthetic turf system wherein a backing member including a relatively soft monofilament ribbon and a relatively stiff monofilament ribbon is laid above a support base. A layer of particulate matter is dispersed above the backing member such that the soft monofilament ribbon and the stiff monofilament ribbon extend through and above the layer of particulate matter. The soft monofilament ribbon includes a means for trapping particulate material wherein application of an outside element to it results in the soft monofilament ribbon standing substantially less erect above the layer of particulate material than the stiff monofilament ribbon.

The means for trapping particulate material may include materials integral with, or coated upon the soft monofilament ribbons such that its response to the outside element results in shrinking, curling, coiling, bending, etc. Alternatively, the means for trapping particulate material can also include the soft monofilament ribbon having a geometry, e.g., cross section (trilobal, star-shaped, or the like) and texture; such that the soft monofilament ribbon can be formed into trapping forms.

One particular type of soft monofilament ribbon may comprise a multi-strand monofilament ribbon, including two or more monofilament ribbons with an extruded spider-web or net-like structure connected there between. Another type of geometry utilized in the soft monofilament ribbon may include a fault therein. Alternatively, the soft monofilament ribbon may be fabricated so that the structural integrity of at least the free ends (the area located above the infill material) facilitates folding, or bending over—so as to cover a portion of the infill material.

In yet another aspect of the present invention, six to eight monofilament fibers or ribbons (it is to be understood that the terms "ribbon" and "fiber" are interchangeable) are bundled together and include at least three stiff monofilament ribbons and at least three soft monofilament ribbons within the bundle.

A still further aspect of the present invention is directed to a synthetic turf system utilizing a micro fiber material attached to the backing member and/or embedded within the layer of particulate material to assist the stabilization or entrapment of the infill material.

DETAILED DESCRIPTION OF THE DRAWINGS

Figure 1:
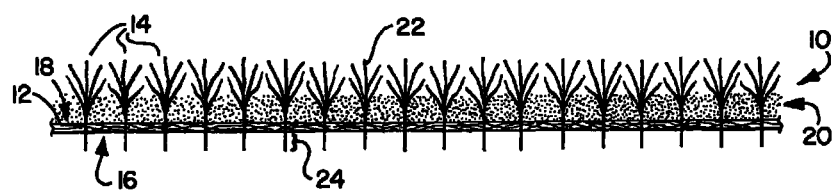
FIG. 1 is a side elevation view of a synthetic grass surface incorporating the monofilament bundles of the present invention.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

With reference to FIG. 1, a synthetic turf system 10 of the present invention is shown, including a flexible backing member 12, and a plurality of monofilament bundles 14 projecting upwardly through a bottom side 16 and upwardly from a top side 18 of the backing member 12. In between the monofilament bundles 14, and on the top side 18 of the backing member 12, is an infill material 20 helping to support at least some of the monofilament bundles 14 in a relatively upright position relative to the backing member 12. These elements cooperate to form an improved synthetic turf system with optimal aesthetic and functional characteristics.

The backing member 12 of the synthetic turf system 10 may comprise one or more layers of flexible material, which are capable of acting as a support structure for the synthetic turf system 10. As with conventional backing materials, the backing may be extruded, woven, non-woven, or a combination thereof.

The monofilament bundles 14 are operatively attached through and to the backing member 12 via any number of means known to one of ordinary skill in the art. For example, the monofilament bundles 14 may be knitted, woven, or tufted into the backing member 12, leaving the top portion 22 of the bundles 14 above the top side 18 of the backing 12, and the bottom portion 24 of the bundles below the bottom side 16 of the backing 12. Thereafter, the bottom portion 24 can be further secured in place using known mechanisms such as, but not limited to, an adhesive or stitching.

Generally, the monofilament bundles 14 are secured into the backing member 12 in generally straight, parallel rows; and then may be fibrillated out to fill the void between the rows. Alternatively, backing shifters or shifting needle bars can be utilized to shift the bundles from straight-line tufting, knitting, or weaving, so as to offset one or more bundles within the rows.

The infill material 20 is placed on the top side 18 of the backing member 12 and in-between the monofilament bundles 14. The infill material 20 can comprise any number of combinations of conventional particulate material, including hard particles, resilient particles, and combinations thereof.

Some typical hard particulate material includes: sand, rock, and hard and heavy plastics; and typical resilient particulate materials can include: rubber (including cryogenic), cork, styrene, epdm rubber, used tires, and neoprene.

Figure 2A:
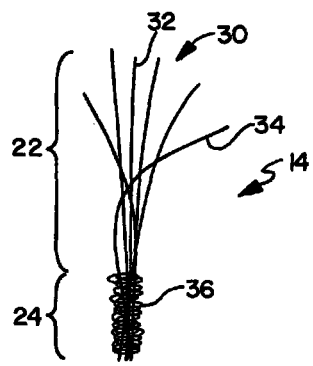
FIGS. 2a-2c are perspective views of a monofilament bundle according to one of several aspects of the present invention.
Figure 2B:
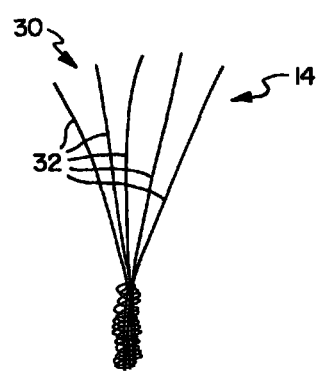
Figure 2C:
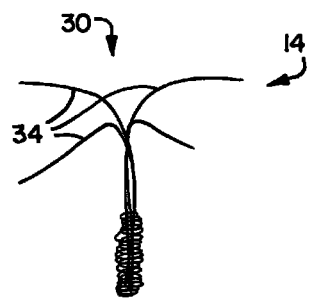

One embodiment of the monofilament bundle 14 is shown in isolation in FIG. 2a. As can be seen, the monofilament bundle 14 includes a bundle of monofilament polymeric fibers 30, including at least one stiff fiber 32, and at least one soft fiber 34. Alternatively, each bundle 30 can include only soft 34 or stiff 32 fibers as shown in FIGS. 2b and 2c. The monofilament fibers 30 are bound together about one end using a binding 36.

The terms "stiff" and "soft" are used to describe the relative flexibility of each of the monofilament fiber types. Stiff ribbons comprise ribbons that have free ends positioned above the top of the infill that remain substantially upright without additional supportive infill. On the other hand, soft ribbons comprise ribbons that bend easily, such that they would not remain as upright as the stiff ribbons without supportive infill. In comparison to soft ribbons, stiff ribbons can be manufactured from polymers having a higher degree of rigidity, tensile strength, tenacity, toughness, or structural integrity, or which result in a synthetic turf field having a higher degree of abrasion. For example, a stiff ribbon could be manufactured from a polymer having a high molecular weight, or which include a particular geometry—extruded from spinnerets having a particular cross section, such as circular, star-shaped, trilobal, or the like. Similarly, a stiff ribbon may comprise multiple individual monofilaments that are bonded or otherwise adhered together to form a more rigid monofilament element.

The composition of a soft ribbon may comprise the same or similar polymer as the stiff ribbon, but for example, at a lower molecular weight. Similarly, a soft ribbon may be formed from a completely different geometry or comprise a completely different polymer altogether, such as polyethylene, polypropylene or nylon. In fact, the relative flexibilities of the "soft" and "stiff" ribbons can be modified by any number of conventional means, including increasing or decreasing the polymerization of the materials, reactivity to cooperating elements, adding flexibility or stiffness additives, copolymerization, or the like.

By using a combination of soft and stiff ribbons within the bundle 14, it is possible to alter the playing and aesthetic characteristics of the field as desired. Thus, slippage and roll of the ball on the playing surface can be reduced by adding more "stiff" ribbons (at least with respect to their "free" ends) to the field, while the undesired splash effect can be reduced by adding more "soft" ribbons to the field. Further, the field characteristics may also be altered by increasing or decreasing the number of monofilament fibers in each monofilament bundle, by increasing or decreasing the number of monofilament bundles in the synthetic grass surface, or by increasing or decreasing the spacing between each of the monofilament bundles.

Figure 7A:
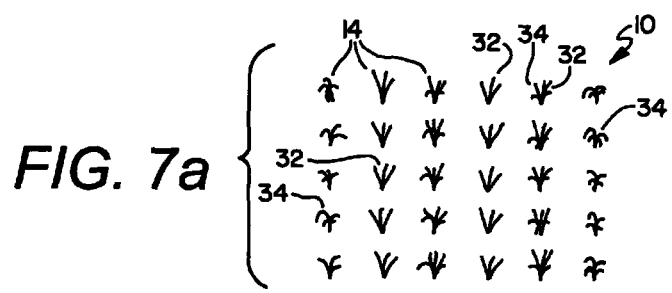
Figure 7B:
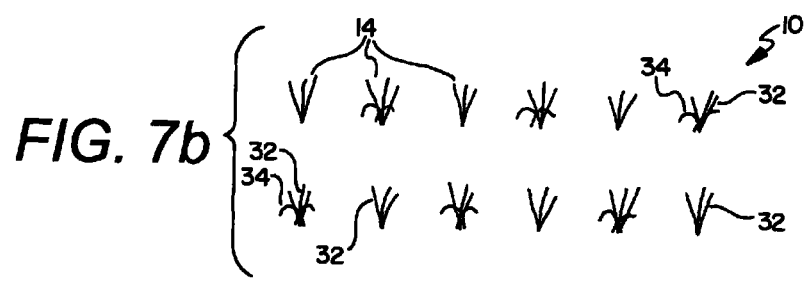
Figure 7C:
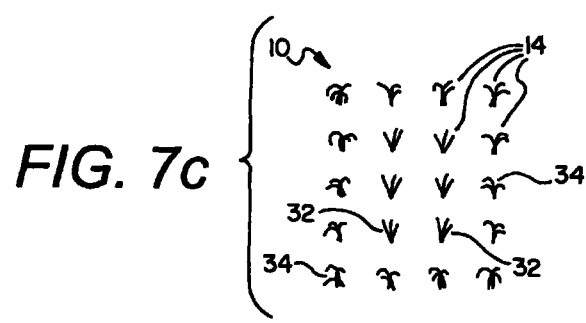

It may be desirable to have more than two levels of blade rigidity within the surface, such that at least one extremely rigid monofilament ribbon or at least one extremely flexible monofilament ribbon could be included in the synthetic surface. By adding multiple levels of firmness to the monofilament ribbons within the surface, a variety of playing characteristics can be imparted. In fact, due to the adaptable configurations of the present invention, specific playing characteristics can be imparted to specific areas of the synthetic surface, if desired. That is, bundles of exclusively soft ribbons, exclusively stiff ribbons, and combinations of soft and stiff ribbons can be configured within the synthetic turf system in a variety of patterns and geometric shapes, as desired; some examples of which are shown in FIGS. 7a-7c.

Figure 3:
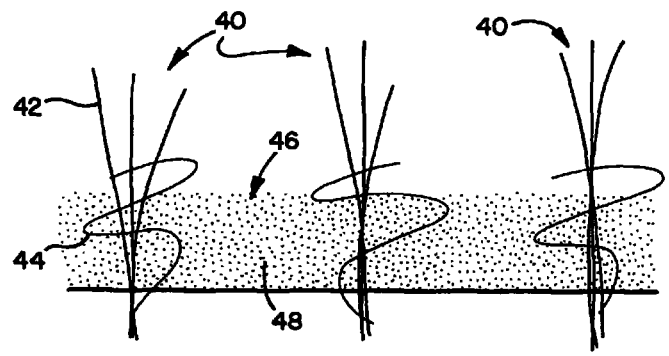
FIG. 3 is a side elevation view of an alternative embodiment of the synthetic turf system according to the present invention.

One alternative embodiment of the present invention directed toward minimizing infill splash during actual use is illustrated in FIG. 3 and depicts the monofilament bundles 40 to include at least one stiff (upright) ribbon 42, and at least one soft (trapping) ribbon 44; both of which include an end bound to the backing member 12 and a respective opposite free end extending above the upper surface 46 of the infill 48. In this embodiment, the upright stiff ribbon 42 extends above the infill to create a grass-like appearance for the synthetic surface, while the soft ribbon 44 acts as a trap or stabilizer for the infill to substantially maintain the infill within the synthetic grass surface.

The upright ribbon 42 can comprise a standard synthetic grass blade, or a stiff blade as described above, which extends through and above the infill 48 to create a grass-like appearance. The trapping ribbon 44, on the other hand, comprises a synthetic grass ribbon having a structure that facilitates "entrapping" or stabilizing the surrounding infill 48. For example, the trapping ribbon 44 may comprise a synthetic grass ribbon that includes a structure or trait—intrinsic or extrinsic—wherein the ribbon has a tendency to lean over, curls coil, wind, or bend after installation or as a result of the application of an outside element, e.g., heat, cold, light, fluid; which may be achieved through the selection of certain temperature, chemical, or light sensitive materials, e.g., polymers or resins, such as nylon, or through the selection of certain coatings or additives for the polymeric ribbons.

Additionally, the soft trapping ribbon 44 may facilitate trapping or stabilizing the infill 48 through a specific geometry or shape of the ribbon. For example, the ribbon may have a cross-sectional shape (such as the trilobal embodiments described above) that limits the movement of infill 48 surrounding the monofilament ribbons. The ribbon may also be formed into a shape or texture through processes such as steaming or gear crimping and the like. Also, the trapping ribbon 44 may include an entangled-type fiber, such as a bulk continuous filament-type ribbon, comprising an entangled extrusion of a plurality of micro fibers or smaller extruded polymer fibers.

Alternately, the stiff ribbon 42 may include a structure or trait—intrinsic or extrinsic—that facilitates its rigidity as compared to the soft ribbon 44 wherein the stiff ribbon retains or has a tendency to stiffen, harden, strengthen, etc., after installation or perhaps as a result of the application of an outside element, e.g., heat, cold, light, fluid; which may be achieved through the selection of certain temperature, chemical, or light sensitive components.

Figure 4A:
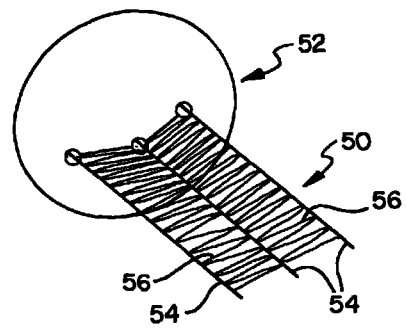
FIG. 4a is a perspective view of a spinneret extruding a multi-strand monofilament according to the present invention.
Figure 4B:
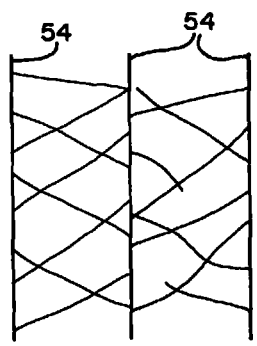
FIG. 4b is a side view of a multi-strand monofilament according to the present invention.

Another alternative embodiment of the invention is shown in FIGS. 4a and b. In FIG. 4a, a multi-strand monofilament 50 is shown being extruded from a spinneret 52. The multi-strand monofilament 50 includes at least two monofilament strands 54 (and is shown with three), and an ultra-thin slit-film extrusion 56 connecting the monofilament strands 54. The slit-film extrusion creates a thin polymeric connection between the monofilament strands 54, which, after conventional post-extrusion processes of stretching and relaxing, separates into a spider-web or net-like structure between the monofilament strands (as shown in FIG. 4b). These monofilament strands 54, when bundled together, may meet both functionalities of a rigid, upright fiber and an entrapping fiber.

Figure 5A:
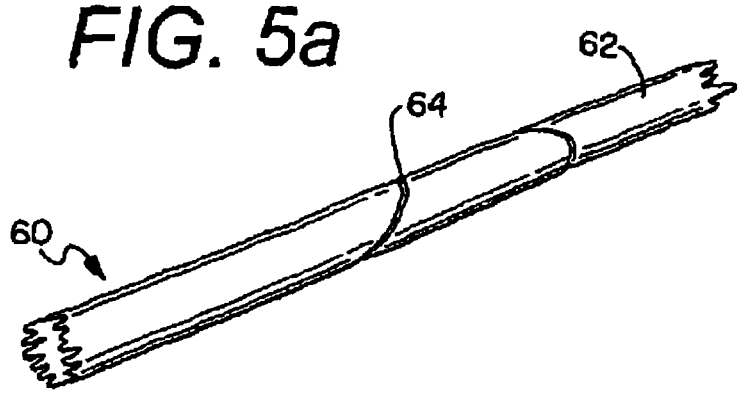
FIG. 5a is a perspective view of a fault-line monofilament according to the present Invention.
Figure 5B:
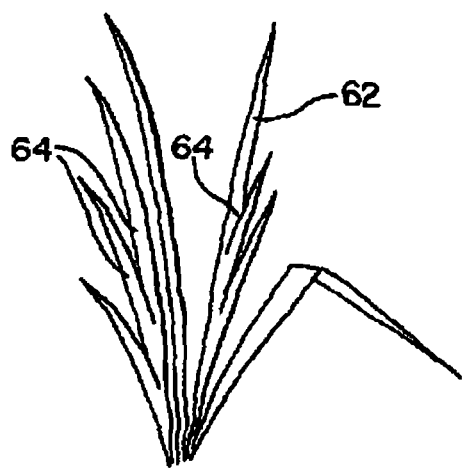
FIG. 5b is a side view of a bundle including at least one fault-line monofilament.

A further embodiment of the invention is shown in FIGS. 5a and 5b. In FIG. 5a, a fault-line monofilament 60 is shown, which consists of an extruded monofilament fiber 62, having at least one fault line 64 thereon. The fault line 64 provides the monofilament fiber 62 with a breaking or fraying point so that the monofilament fiber 62 breaks and/or frays after installation into the synthetic turf field. The fault-line monofilaments 60 can be combined into a bundle (such as in FIG. 5b), and then frayed or broken, to create a stabilizing web or net-like structure for the surrounding infill 48. In general, only a portion of the fault-line monofilament 60 fibers will crack or fray in practice, such that the fault-line monofilament 60 can be combined with standard, stiff, or upright monofilament fibers, or can simply function as an operative bundle on its own.

Preferably, each monofilament bundle includes between six to eight monofilament fibers, including one or more that do not bend, i.e., stiff or upright, and one or more ribbons that facilitate the entrapment of the infill, i.e., the soft or trapping ribbons. Desirable combinations between the characteristics of these two types of ribbons can be determined without undue experimentation, but preferably a bundle includes at least three softer ribbons and three or more stiffer ribbons. Of course, other combinations of numbers of monofilament fibers, as well as the relative breakdown of soft and stiff ribbons within the bundle, can be configured as desired.

Figure 6:
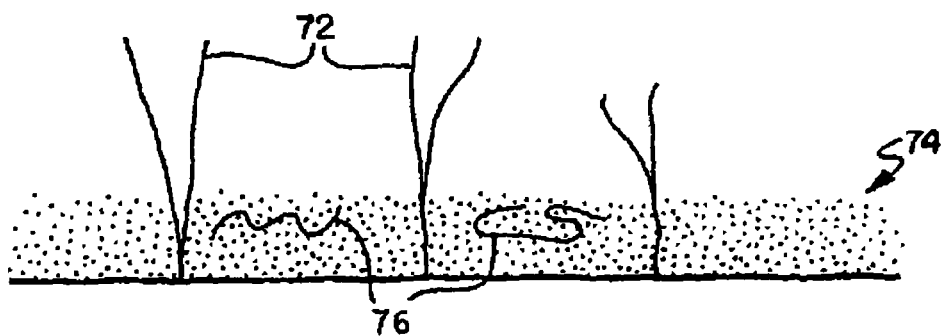
FIG. 6 is a side elevation view of an alternative embodiment of the synthetic turf system according to the present invention; and, FIGS. 7a-7c are schematic sketches of top views of portions of a synthetic turf system depicting several layouts of fiber bundles.

While the above description has focused on the structure and texture of the monofilament fibers to achieve the desired balance between field playability and infill control, the present invention may also achieve infill control through the direct control of the infill materials. Thus, in one embodiment of the present invention shown in FIG. 6, a synthetic grass surface 70 includes upright ribbons 72 of any conventional type including monofilament type ribbons, and an infill 74 interspersed between the ribbons. The infill 74 additionally includes micro-fiber strands 76 interspersed within the infill. The micro-fiber strands 76 can comprise any number of micro-fiber structures such as small pieces of polymer or the like, which can help to stabilize and/or maintain the infill in place during play. Preferably, the micro-fiber strands 76 are manufactured from a material that has a relatively low melting point—such as a low density nylon—wherein during use and play, the micro-fiber strand 76 can partially melt or deform; thus entangling itself with the infill material.

It should be emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the scope of this disclosure and the present invention, and protected by the following claims.

What is claimed is:

1. A synthetic turf system, comprising:
   a backing member;
   a layer of particulate material dispersed above the backing member with a thickness, wherein the synthetic turf system further comprises a plurality of microfiber strands interspersed within the layer of particulate material; and,
   a plurality of synthetic ribbons each of which is tufted through the backing member, the synthetic ribbons including a soft monofilament ribbon and a stiff monofilament ribbon, the soft monofilament ribbon extending substantially linear and perpendicular from the backing member up to the thickness of the layer of particulate material and including a free end extending out of and above the layer of particulate material, wherein a structural characteristic of the soft monofilament ribbon is that the free end extending out of and above the layer of particulate material bends over so as to provide a trapping mechanism for the particulate material.

2. The synthetic turf system of claim 1 further comprising a bundle of the plurality of synthetic ribbons wherein the bundle includes at least one stiff monofilament ribbon.

3. The synthetic turf system of claim 1 further comprising a bundle of the plurality of synthetic ribbons wherein the bundle includes at least one soft monofilament ribbon.

4. The synthetic turf system of claim 3 wherein the bundle further includes at least one stiff monofilament ribbon.

5. The synthetic turf system of claim 1 wherein the soft monofilament ribbon includes a multi-monofilament ribbon including an extruded net structure there between.

6. The synthetic turf system of claim 1 wherein the soft monofilament ribbon includes a trait physically responsive to an application of an outside element.

7. The synthetic turf system of claim 6 wherein the trait comprises an integral polymer or resin responsive to heat.

8. The synthetic turf system of claim 6 wherein the trait comprises a coating of polymer or resin responsive to heat.

9. The synthetic turf system of claim 1 wherein the structural characteristic of the soft monofilament ribbon includes a geometry such that the soft monofilament ribbon stands substantially less erect above the layer of particulate material than the stiff monofilament ribbon.

10. The synthetic turf system of claim 9 wherein the geometry is a cross section of the soft monofilament ribbon.

11. The synthetic turf system of claim 9 wherein the geometry is a texture of the soft monofilament ribbon.

12. The synthetic turf system of claim 9 wherein the geometry includes a fault line within the soft monofilament ribbon.

13. The synthetic turf system of claim 1 further comprising a bundle including a plurality of monofilament ribbons.

14. The synthetic turf system of claim 13 wherein the bundle includes soft monofilament ribbons.

15. The synthetic turf system of claim 13 wherein the bundle includes stiff monofilament ribbons.

16. The synthetic turf system of claim 15 wherein the bundle includes soft monofilament ribbons.

17. The synthetic turf system of claim 16 wherein the bundle comprises a combination of at least six stiff or soft monofilament ribbons.

18. The synthetic turf system of claim 13 wherein the soft monofilament ribbon comprises an integral polymer or resin responsive to heat.

19. The synthetic turf system of claim 13 wherein the soft monofilament ribbon comprises a coating of polymer or resin responsive to heat.

20. The synthetic turf system of claim 1 wherein the soft monofilament ribbon has a cross-sectional area that determines the flexibility of the soft monofilament ribbon and the stiff monofilament ribbon has another cross-sectional area that determines the flexibility of the stiff monofilament ribbon.

21. The synthetic turf system of claim 20 wherein the cross-sectional area and the another cross-sectional area different.

22. A synthetic turf system, comprising:
   a backing member;
   a layer of particulate material dispersed above the backing member; and,
   a plurality of synthetic ribbons each of which is tufted through the backing member, a plurality of micro-fiber strands interspersed within the layer of particulate material, the synthetic ribbons including a soft monofilament ribbon comprised of a first material and a stiff monofilament ribbon comprised of a second material, each of the soft and stiff monofilament ribbons including a free end extending out of and above the layer of particulate material wherein the stiff monofilament ribbon stands substantially more erect above the layer of particulate material than the soft monofilament ribbon and wherein the first material and the second material are the same polymer, and wherein both the soft monofilament ribbons and the stiff monofilament ribbons include a portion supported by the particulate material in a relatively upright position with respect to the backing member, and the particulate material provides the soft ribbons with the relatively upright position with respect to the backing member.

23. A synthetic turf system, comprising:

a backing member;

a layer of particulate material dispersed above the backing member;

a plurality of micro-fiber strands interspersed within the layer of particulate material, a stiff monofilament ribbon comprised of a first material and having a free end and being tufted through the backing member wherein the free end of the stiff monofilament ribbon extends through and above the layer of particulate material; and, a soft monofilament ribbon comprised of a second material and having a free end and being tufted through the backing member wherein the free end of the soft monofilament ribbon extends through and above the layer of particulate material, the soft monofilament ribbon further including a means for trapping the particulate material of the layer such that the soft monofilament ribbon stands substantially less erect above the layer of particulate material than the stiff monofilament ribbon; and wherein the first material and the second material are the same polymer; and wherein both the soft monofilament ribbon and the stiff monofilament ribbon include a portion supported by the particulate material in a relatively upright position with respect to the backing member, and the particulate material provides the soft ribbons with the relatively upright position with respect to the backing member.

* * * * *